US007004580B2

(12) United States Patent
Jackson et al.

(10) Patent No.: US 7,004,580 B2
(45) Date of Patent: Feb. 28, 2006

(54) ADJUSTABLE AND RECONFIGURABLE EYEGLASSES

(76) Inventors: Michael T. Jackson, 128 Arches Dr., Moab, UT (US) 84532; Eleanor W. Jackson, 128 Arches Dr., Moab, UT (US) 84532

(*) Notice: Subject to any disclaimer, the term of this patent is extended or adjusted under 35 U.S.C. 154(b) by 0 days.

(21) Appl. No.: 10/693,761

(22) Filed: Oct. 23, 2003

(65) Prior Publication Data
US 2005/0088613 A1 Apr. 28, 2005

(51) Int. Cl.
G02C 1/00 (2006.01)
(52) U.S. Cl. .............. 351/86; 351/43; 351/83; 351/136
(58) Field of Classification Search ........... 351/41, 351/62, 86, 83, 156, 157, 158, 136, 43; 2/441
See application file for complete search history.

(56) References Cited

U.S. PATENT DOCUMENTS

| 861,074 | A | | 7/1907 | Applegate | |
|---|---|---|---|---|---|
| 1,971,389 | A | | 11/1934 | Shindel | |
| 2,659,269 | A | | 3/1953 | Castelli | |
| 2,652,746 | A | | 9/1953 | Shanks | |
| 3,797,921 | A | | 3/1974 | Kilmer et al. | |
| 4,021,103 | A | * | 5/1977 | Gaspari | 351/126 |
| 4,070,103 | A | | 1/1978 | Meeker | |
| 4,802,754 | A | * | 2/1989 | Neef | 351/138 |
| 5,087,118 | A | * | 2/1992 | Gill | 351/156 |
| 5,093,940 | A | * | 3/1992 | Nishiyama | 2/441 |
| 5,182,817 | A | | 2/1993 | Branum | |
| 5,469,229 | A | | 11/1995 | Greenbaum | |
| 5,495,303 | A | | 2/1996 | Kolentsi | |
| 5,631,716 | A | * | 5/1997 | Chao | 351/41 |
| 5,638,144 | A | | 6/1997 | Vakavtchiev | |
| 5,790,227 | A | | 8/1998 | Rorabaugh | |
| 6,092,897 | A | * | 7/2000 | Smerdon, Jr. | 351/157 |
| 6,481,025 | B1 | | 11/2002 | Hill | |
| 6,513,925 | B1 | * | 2/2003 | Bonacci | 351/43 |
| 2002/0029399 | A1 | | 3/2002 | Hill | |

OTHER PUBLICATIONS

Barz Optics, Barz Optics "ARFA" line, http://www.barzoptics.com/product.htm.

* cited by examiner

Primary Examiner—Hung Xuan Dang

(57) ABSTRACT

An eyewear device includes a frame having two elongate extensions rotatably attached to the frame and movable between a deployed position and a stored position. The frame has two lens receiving portions with multiple lens units insertable in the lens receiving portion some through the front surface and some through the rear surface. The lens units have different eye glass lenses held therein. The elongate extensions include at least one head grip that is movable between two positions in which the head grip extends away from the stem, extensions, ears or temples different distances. A retainer is provided to hold the eyewear to the head; and a leash is provided to secure the eyewear to the clothing. The lens receiving portions have ridges that are configured to interact with grooves in the lens units to hold them in the frame. including a peripheral encasing. The lens units may have a nose piece with a nose pad configured to be removable and to adjust the distance of the nose pad from a support surface.

44 Claims, 13 Drawing Sheets

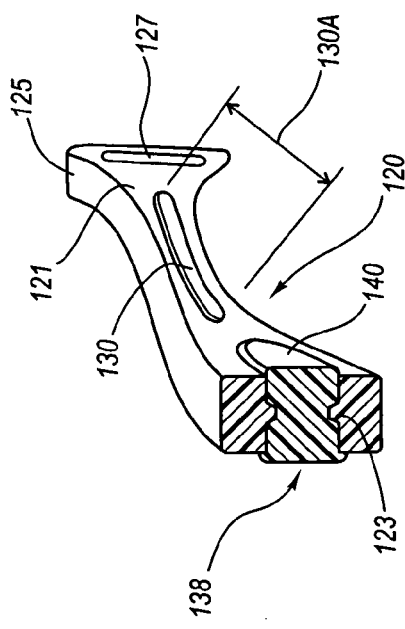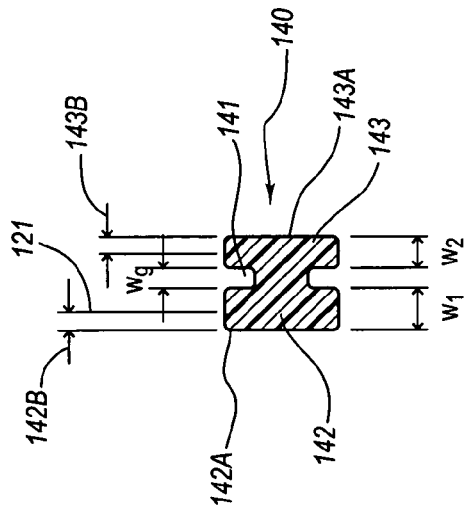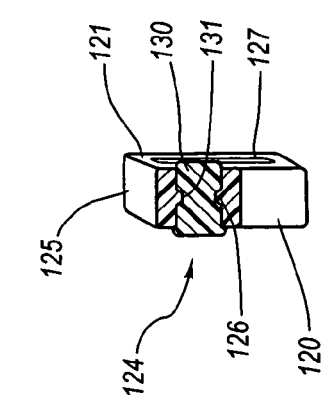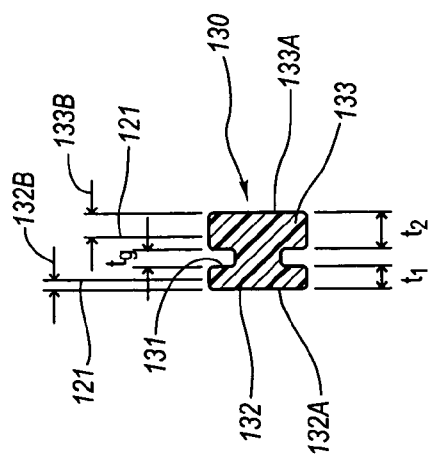

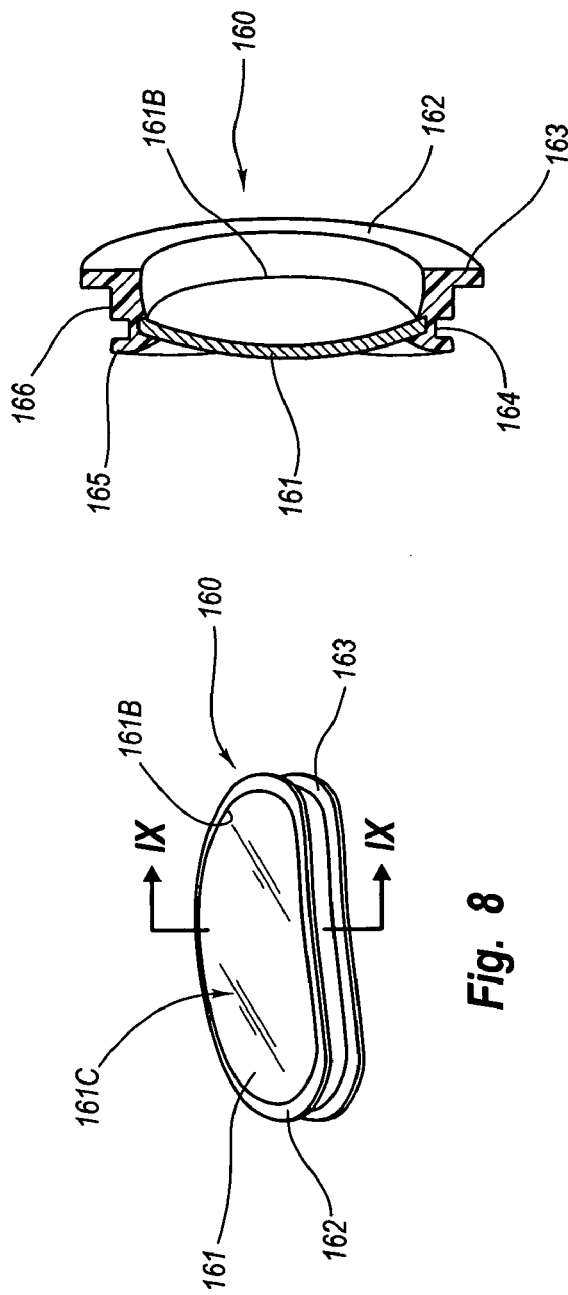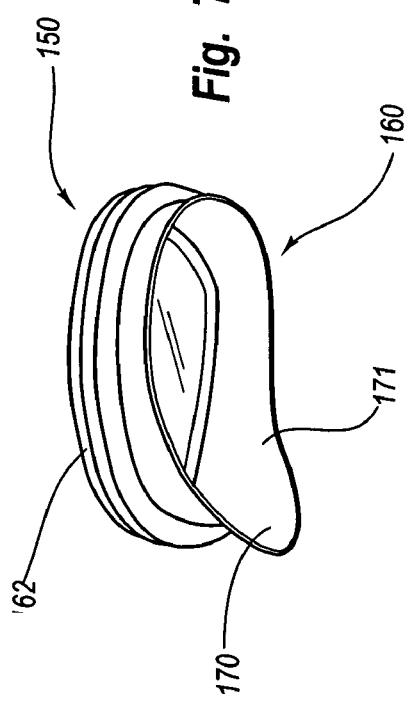

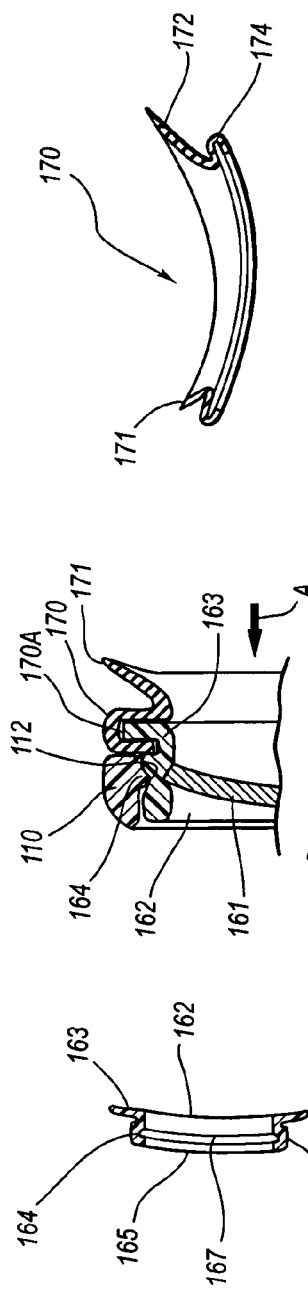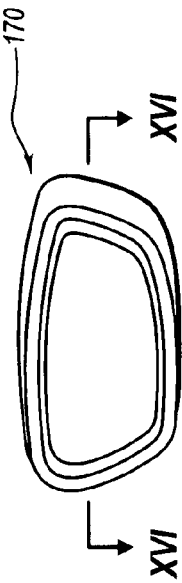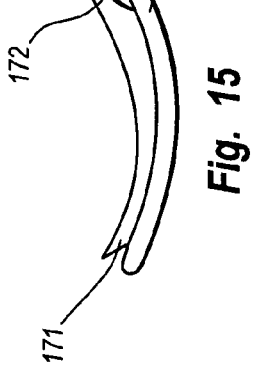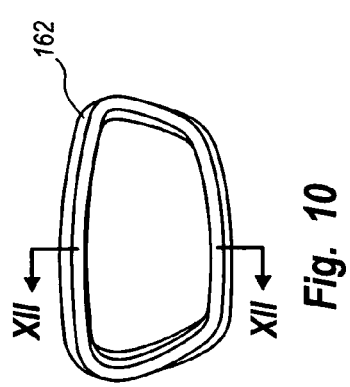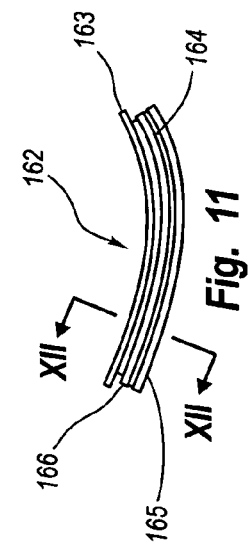

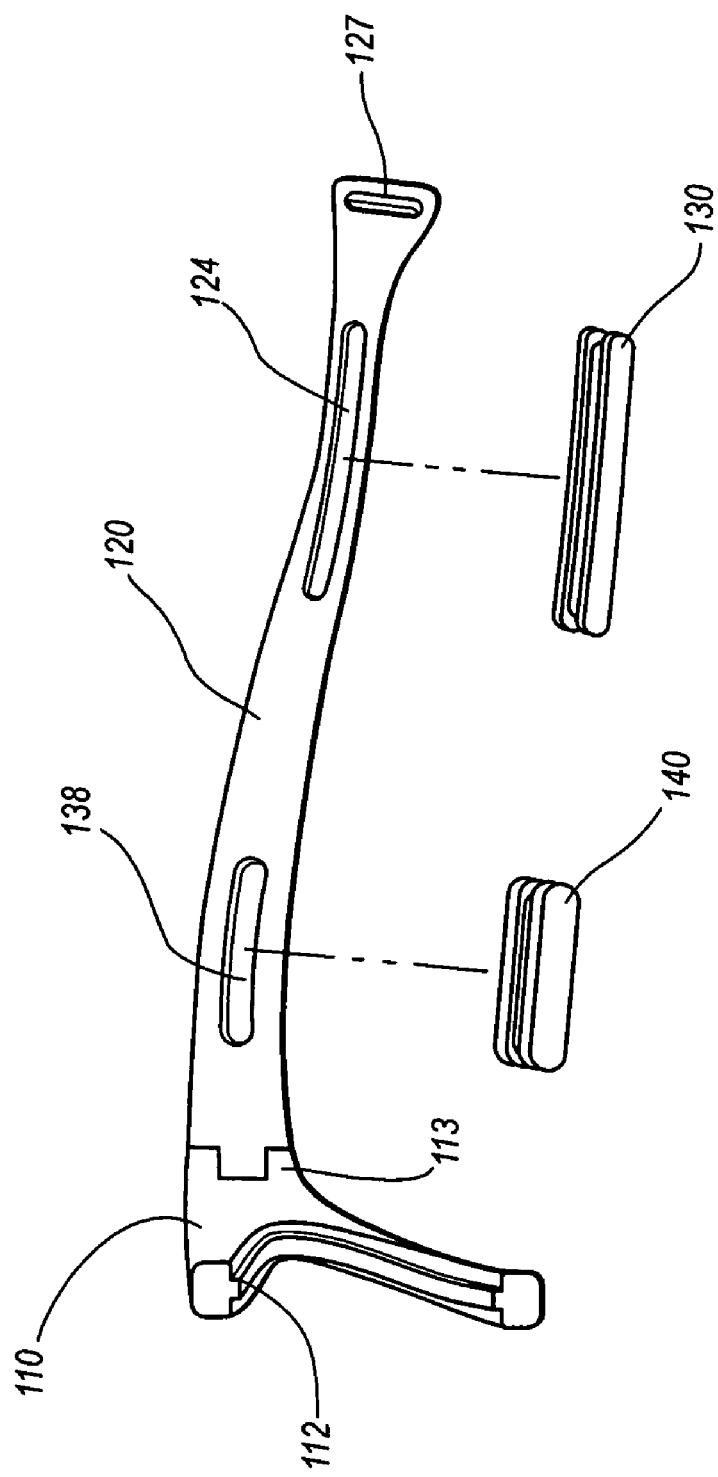

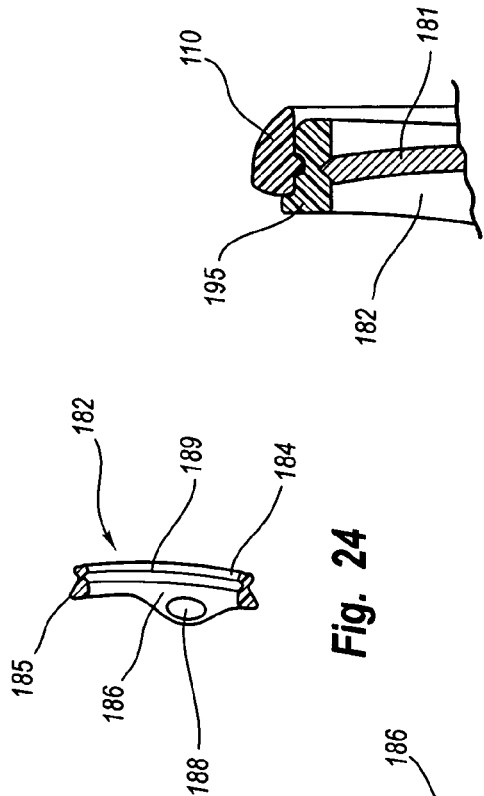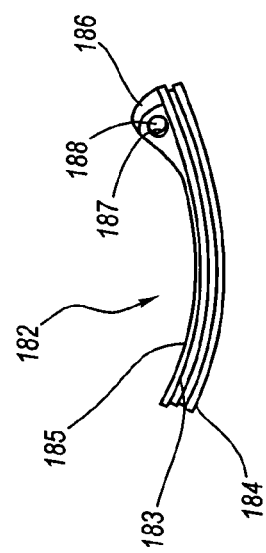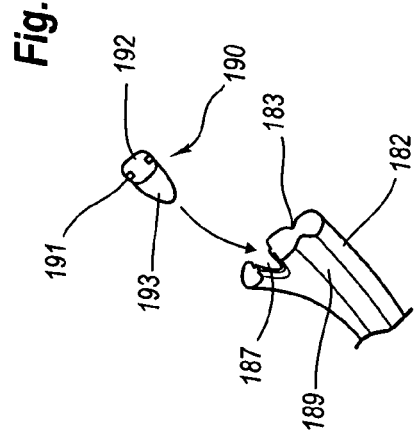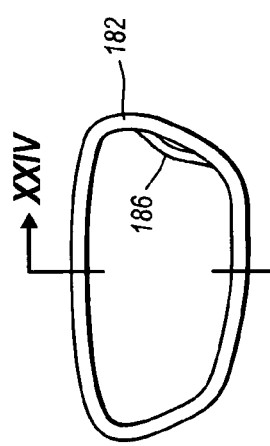

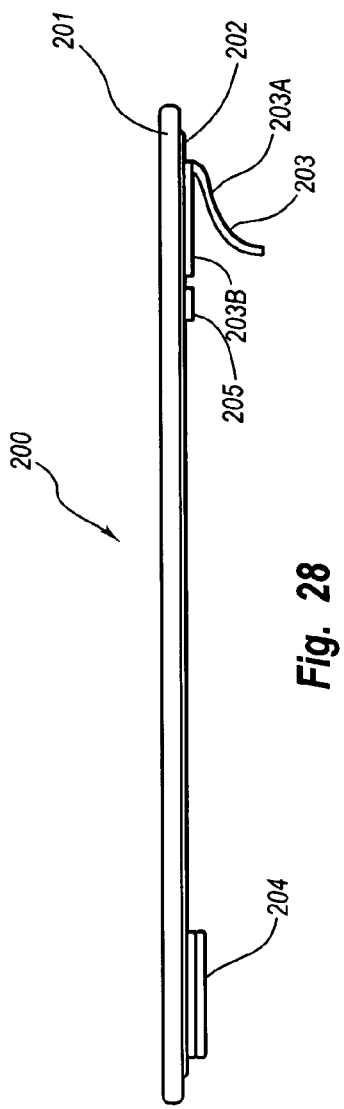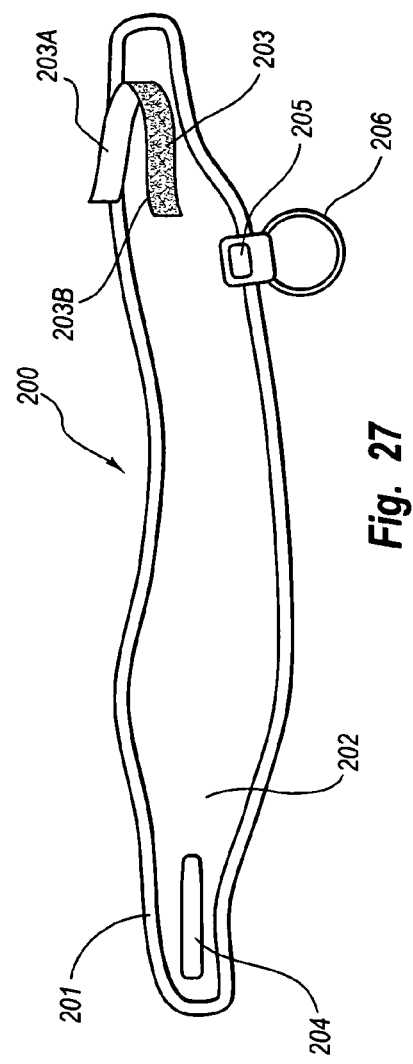
Fig. 28
Fig. 27

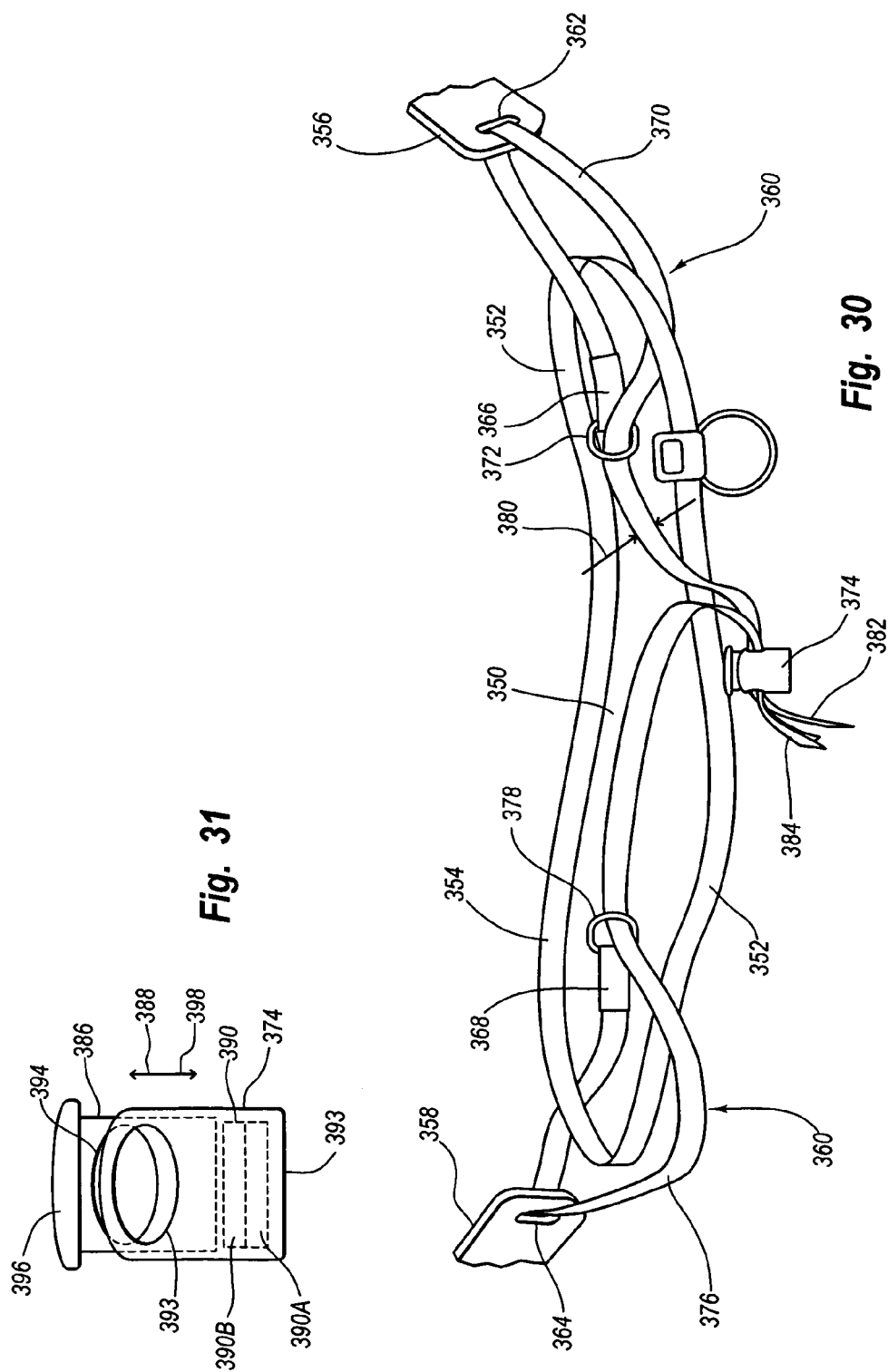

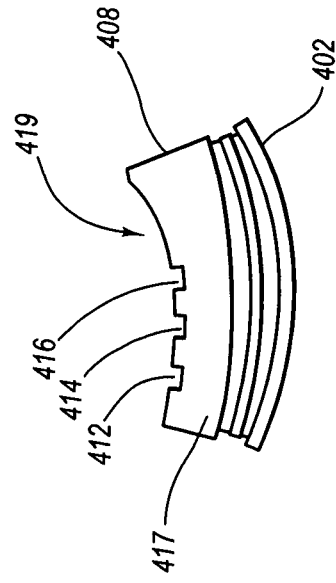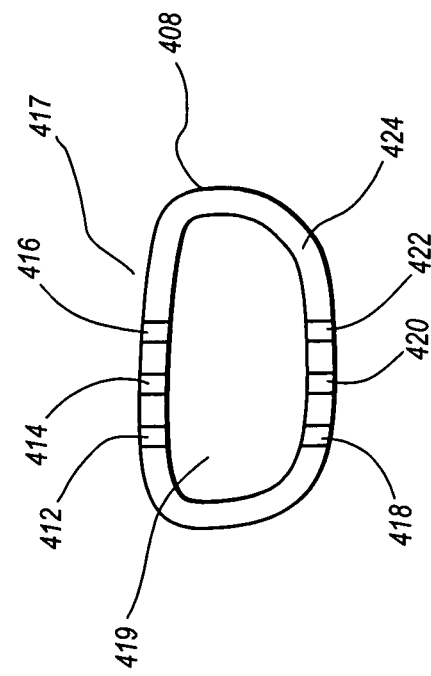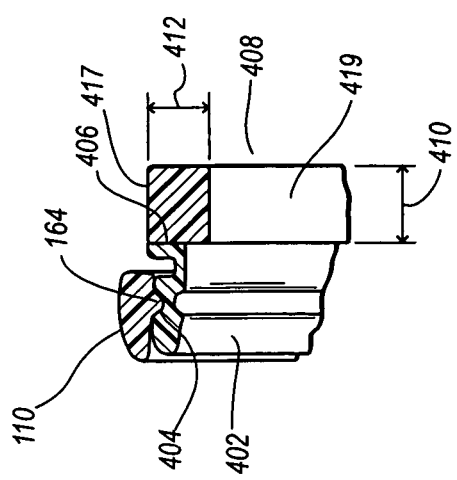

US 7,004,580 B2

ADJUSTABLE AND RECONFIGURABLE EYEGLASSES

BACKGROUND OF THE INVENTION

1. The Field of the Invention

The present invention generally relates to eyeglasses and more specifically, to eyeglasses having interchangeable lens units and to eyeglasses easily adjusted to fit the user.

2. State of the Art

Glasses are well known utilitarian articles and are now items of apparel and of utility that come in various shapes and sizes to provide unique styles and lens types. U.S. Pat. No. 4,070,103 to Meeker discloses a spectacle combination which allows a person to change the frames of a pair of glasses to match any individual fashion or mood. The eyeglasses include a number of attachable pairs of one-piece lens rim covers of various colors, designs, shapes and materials. The lens rim covers are securely held in position by a lip, friction tape, magnetic strips or a snap-on type of friction fitting arrangement. The lens rim covers can be modified to change the shape of the lens, for instance, from the standard elliptical shape to a more high fashion octagonal square or rectangular shape. Additionally, tinted lens may be inserted in the individual pairs of lens rim covers in order to transform normal spectacles into light filters such as sunglasses.

Eyeglasses are typically held on the user's nose by the force of gravity and stabilized with stems, ears or extensions that are also sometimes called temples or temple pieces. The temples or temple pieces extend from the frame or rim near the temples rearward over the user's ears. The eyeglasses, however, are easily detached and can slip off or be lost when the wearer is involved in rigorous physical activity like bicycling, skiing, jogging, windsurfing, kayaking and the like.

A variety of eyeglass retainers have evolved that are or have been on the market. The retainers (e.g. the CHUMS brand, the EK brand) attach to the ends of the stems, extensions or temples and drape behind the head.

In order to fit eyeglasses to the head of a user, eyeglasses are typically adjusted by bending the stems, temples or ears and/or by bending a nose piece if a separate one is provided. Adjustments thus are made by bending which distorts the frames and nose piece which can lead to failure or a fit that cannot be easily adjusted based on the activity.

While some glasses are known to have interchangable lenses and lenses for a wide range of uses (e.g., ski goggles to deal with different light conditions), the lenses have open edges that expose them to damage and the user to whatever risks may be presented by the edges of the lenses. The lenses may be made from glass but also a wide range of other materials selected because they are break resistant, less prone to scratching or otherwise have preferred or desired features or characteristics.

There is no known eyeglass device which allows one to select lenses for use in a wide range of conditions including, for example, skiing and swimming while being adjustable and adapted for better retention on the head when in use.

BRIEF SUMMARY OF THE INVENTION

An eyewear device has a frame for positioning proximate the eyes of a user. The frame includes at least one lens-receiving portion. Means are provided for retaining the frame proximate the eyes of a user and about the head of the user.

One or more lens units are provided each having eyeglass lens means for positioning in front of an eye of a user and a casing configured to receive and retain the eyeglass lens means. Each lens unit is removably positionable in a lens receiving portion.

In a preferred construction, the lens-receiving portion includes a rim member defining a lens area to receive each lens unit therein. The rim member has a rim ridge extending toward or into the lens area. The casing of each lens unit has a groove formed therein sized to snap into and thus to snuggly receive the rim ridge upon positioning the lens unit in the lens receiving portion. In a more preferred alternate arrangement, the lens receiving portion includes a first rim defining a first lens area and a second rim defining a second lens area. The first rim has a first rim ridge extending toward or into the first lens area; and the second rim ridge extends toward and into the second lens area.

The eyeglass lens means desirably includes a first lens and a second lens. The casing may alternately have a first lens frame configured to receive and retain the first lens and a first groove sized to effect a snap fit connection to the first rim and thus to snuggly receive the first rim ridge upon positioning of the first lens frame in the first lens area. Similarly the casing alternately may have a second lens frame configured to receive and retain the second lens and a second groove sized to effect a snap fit with the second rim ridge and thus to snuggly receive the second rim ridge upon positioning of the second lens frame in the second lens area.

In an alternate arrangement, the frame is spaced from the outer surface of the eye socket of a user a seal distance when the frame is positioned proximate the eyes of a user. Preferably the eyewear device further includes a seal member attached to the casing to extend from the casing toward the eye socket of a user. The casing preferably has a lip extending outward from said casing toward the eye socket of a user when said eyewear device is positioned proximate the eyes of a user. The seal member is attached to the lip.

In preferred configurations, the seal member is formed of a wind resistant material which is even more preferably elastically deformable and water resistant. It is preferred to be generally tubular in shape with an interior and an exterior. It may be configured to have or be formed to define a first seal for effecting a seal against the eye socket area to inhibit fluid flow from exterior of the seal member into the interior of the seal member. The seal member may also include a second seal for attaching the seal member to the casing to inhibit fluid flow from exterior said seal member to the interior of said seal member. Thus it can be seen that the seal member when affixed allows for use swimming, skiing and even in bright light conditions such as those found when cross country skiing in bright sunlight.

In yet another or alternate assembly, the eyeglass lens has a perimeter with the casing formed to extend about the entire perimeter. The lip extends from the casing about the entire perimeter of the eyeglass lens. A seal ridge extends outwardly from the perimeter. The second seal of the seal member includes a channel to snuggly receive said seal ridge so that when the seal member is affixed over the seal ridge, the second seal is urged against the frame to further enhance or strengthen the seal. The seal member desirably is made from a rubber like material which is elastically deformable.

In preferred configurations, the means for positioning the frame proximate the eyes of a user includes a first elongate extension and a second elongate extension each connected to the frame to extend toward the user's ears with said frame positioned proximate the eyes of a user. The first and second elongate extensions may be rotatably mounted to the frame to move between a deployed position extending toward the user's ears, and a stored position when the first and second extensions are rotated toward the frame.

The first and said second elongate extensions each have an interior surface oriented toward the head of the user when said frame is positioned proximate the eyes of the user. The first and said second elongate extensions each have at least one head grip aperture formed therein sized to receive a head grip. A head grip is preferably positioned in at least one, preferably both and even more preferably all of the head grip apertures. Each head grip is sized and shaped to extend away from the interior surface of the elongate extension to frictionally contact the head of a user when said eyewear device is positioned on the head of a user.

The head grip has a first exterior surface for frictionally contacting the head of a user and a second exterior surface for frictionally contacting the head of a user, The second exterior surface and the first exterior surface are in general alignment and spaced from each other. The head grip being is formed to be removably positionable in the head grip aperture in a first position and in a second position. In the first position the first surface is oriented toward the head of the user and spaced away from said interior surface of the elongate extension a first distance. The head grip in said second position has said second surface oriented toward the head of the user and is spaced away from the interior surface a second distance which is greater or larger than the first distance and is preferably twice the first distance.

In alternate embodiments, the first extension and said second extension may each have a plurality of head grip apertures with a head grip removably positioned in each of the head grip apertures to allow the user to adjust the relationship of the extensions to the user's head and in turn adjust the snugness or attachment.

In preferred constructions, each of the head grip apertures includes a ridge and each of the head grips is formed to include a channel formed to receive the ridge therein in both the first and second positions. Each head grip is preferably formed from an elastically deformable material such a rubber or rubber like compounds.

In some configurations, the first elongate extension and the second elongate extension each have a proximal end which is rotatably secured to the frame and a distal end opposite said proximal end. A retainer is provided and it has a first end, a second end and a stretch in between. The first end and the second end each are attachable to a distal end of the first extension and the second extension to extend about the rear of the head with the frame positioned proximate the eyes of a user. The stretch is preferably configured to have a height and is adjusted to be snuggly positioned about the rear of the head. Preferably a first retaining aperture is formed in the first elongate extension proximate its distal end; and a second retaining aperture is formed in the second elongate extension proximate its distal end. The first end of the retainer is configured to attach to the first retaining aperture and the second end of the retainer is configured to attach to the second retaining aperture The length of the stretch may also be adjustable.

In some alternate configurations, a leash or tether is provided for securing the eyewear device to the clothes of a user. A fastener is provided at its opposite ends to effect the connection.

In a very desired alternate embodiment, the casing of an alternate lens unit has a nose piece oriented toward the nose of a user when the lens unit is positioned in the lens receiving portion of the frame. The nose piece has a support surface oriented toward the user's nose. A nose pad aperture is formed in the support surface and a nose pad is removably positioned in the nose pad aperture. The nose pad having a first nose surface and a second nose surface each for contact with the user's nose. The second nose surface and the first nose surface are spaced from each other and in general alignment. The nose pad is formed to be removably positionable in the nose pad aperture in a first position and in a second position,. In the first position, the first nose surface is oriented toward the nose of the user and spaced away from the support surface of the nose piece a first distance. In the second position, the second nose surface is oriented toward the nose of the user and spaced away from the support surface of the nose piece a second distance which is greater than said first distance and most preferably twice the first distance. The nose piece is preferably made of an elastically deformable material like rubber. In desired arrangements, the nose piece aperture has a nose piece ridge which interacts with a channel formed in the nose pad sized to receive said nose piece ridge In highly desirable configurations, the eyewear has a first lens unit and a second lens unit. In other arrangements additional lens units may be provided an used interchangeably. The casings of the lens units may have a perimeter that surrounds the perimeter of a lens with the perimeter having a groove to interface with a ridge in the frame. A selected lens unit will have a casing with a lip that impedes the movement of the casing through the lens retaining opening from inside or the rear of the frame to the front or outside of the frame. Other lens units are configured with a lip to impede movement of the casing through the lens retaining opening from outside or the front of the fame toward the eye socket or inside of the frame.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only selected embodiments of the invention which are presently preferred and are therefore not to be considered limiting of the scope of the invention or the appended claims.

FIG. 3 is a first cross-section of the eyeglass of FIG. 2 taken at the section lines III—III;

FIG. 4 is a cross-sectional view of the head grip illustrated in FIG. 3;

FIG. 5 is a second detailed cross-section of the eyeglass of FIG. 2 taken at section lines V—V;

FIG. 6 is a cross-sectional view of the head grip of the eyeglass illustrated in FIG. 4;

FIG. 7 is a rear perspective view of a lens unit of the type used in the embodiment or configuration of FIG. 2;

FIG. 8 is a perspective view of a casing or rim assembly of FIG. 7;

FIG. 9 is a cross-sectional view of the casing or rim assembly illustrated in FIG. 8 taken at section lines IX—IX;

FIG. 10 is a front view of the casing or rim illustrated in FIG. 8;

FIG. 11 is a top view of the casing or rim of FIG. 10;

FIG. 12 is a cross-sectional view of the casing or rim of FIG. 10 taken at section lines XII—XII;

FIG. 13 is a partial cross-sectional depiction of the assembly of a lens unit and frame illustrated in FIG. 2;

FIG. 14 is a schematic front view of a sealing member of the lens unit of FIG. 7;

FIG. 15 is a schematic side view of the sealing member illustrated in FIG. 14;

FIG. 16 is a cross-sectional view of the sealing member illustrated in FIG. 14;

FIG. 18 is a detailed cross-sectional view of the eyeglass of FIG. 17 along section lines XVIII—XVIII;

FIG. 22 is a front view of the lens unit illustrated in FIG. 19;

FIG. 23 is side view of the lens unit illustrated in FIG. 22;

FIG. 24 is a cross-sectional view of the lens unit illustrated in FIG. 22 taken at section lines XXIV—XXIV;

FIG. 25 is a partial cross-sectional view of the lens unit of FIG. 20 assembled into a frame;

FIG. 26 is a partial cross-sectional and exploded view of the lens unit of FIG. 22 and nose grip of FIG. 19;

FIG. 27 is a depiction of a retaining strap of the present invention;

FIG. 28 is a top view of the retaining strap of FIG. 27;

FIG. 30 is a depiction of an alternate retaining strap of the present invention;

FIG. 31 is a depiction of a lock for use with the alternate retaining strap of FIG. 30;

FIG. 32 is a partial cross sectional view of a lens unit assembled into a frame;

FIG. 33 is a top view of the lens unit of FIG. 32; and

FIG. 34 is a rear view of the lens unit of FIG. 32.

DETAILED DESCRIPTION OF THE PREFERRED EMBODIMENTS

An eyewear device of the present invention includes a frame with various interchangeable lens units each configured for particular desired needs or circumstances. For example, lens units can be configured to function as sunglasses lenses, prescription or corrective lenses, swimming goggles, safety glasses, clear lenses, bifocal lenses, or any other suitable eye glass need or function.

Figure 1:
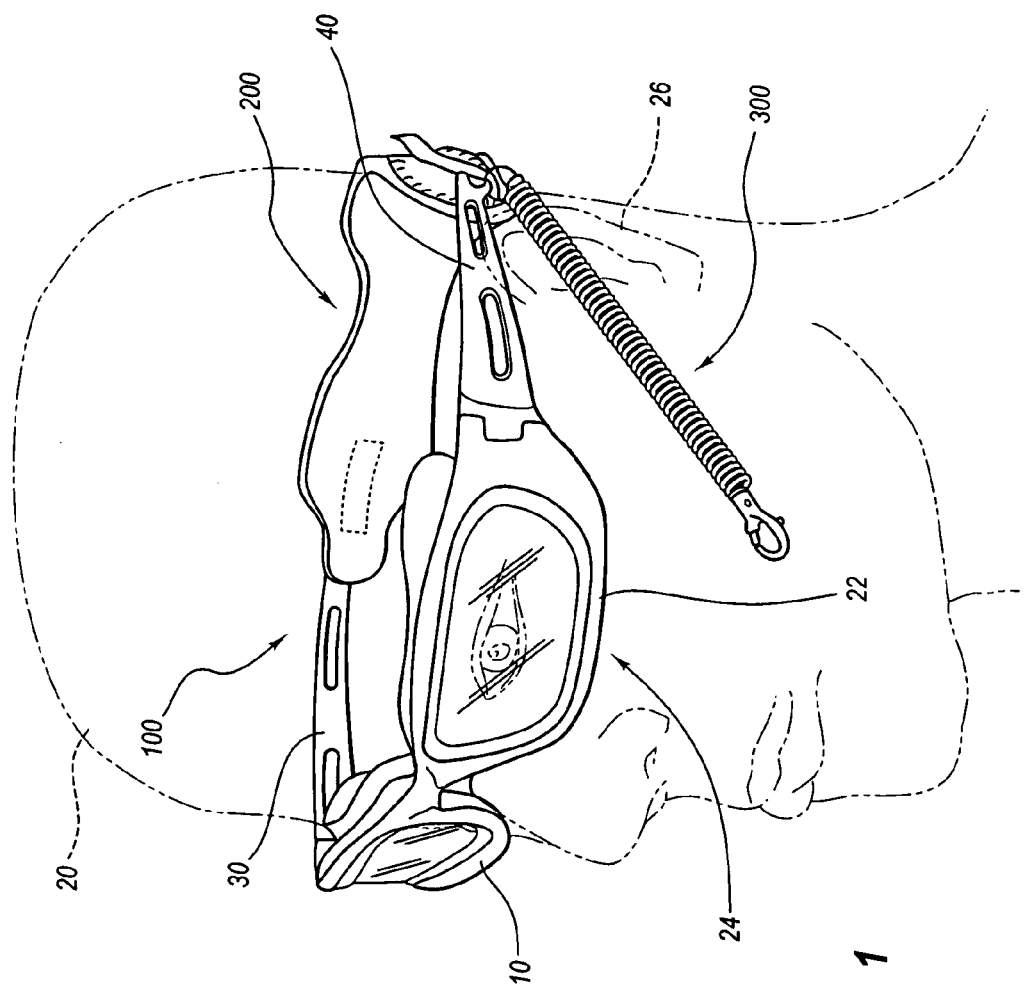
FIG. 1 is a perspective view of an eyewear device of the present invention.

In various exemplary embodiments, FIG. 1 illustrates an eyewear device 100 having a frame 10, positioned on the head of the user 20 depicted phantom. The frame 10 is positioned about or proximate the eye socket area 24 and the eyes 22 as other known eye glasses. A first extension 30 and a second extension 40 are rotatably mounted to the frame 10 to extend toward the ears 26 of the user 20. A retainer 200 is provided to hold the eyewear device 100 in place about the head of the user 20; and a safety leash 300 is provided to connect the retainer 200 to the any suitable item of apparel of the user 20. The safety leash 300 connects the eyewear device to the user 20 in case the eyewear device becomes dislodged from the user 20 due to physical activity, such as swimming, skiing, cycling, jogging, running, hiking and any involved crash or other event that could cause the user 20 to suddenly stop allowing for the dislodgement of the eyewear device 100 from the head of the user 20. The safety leash 300 provides additional means to retain the eyewear assembly on the person of the user 20 so that the eyewear device 100 is less likely to become lost or damaged.

Figure 2:
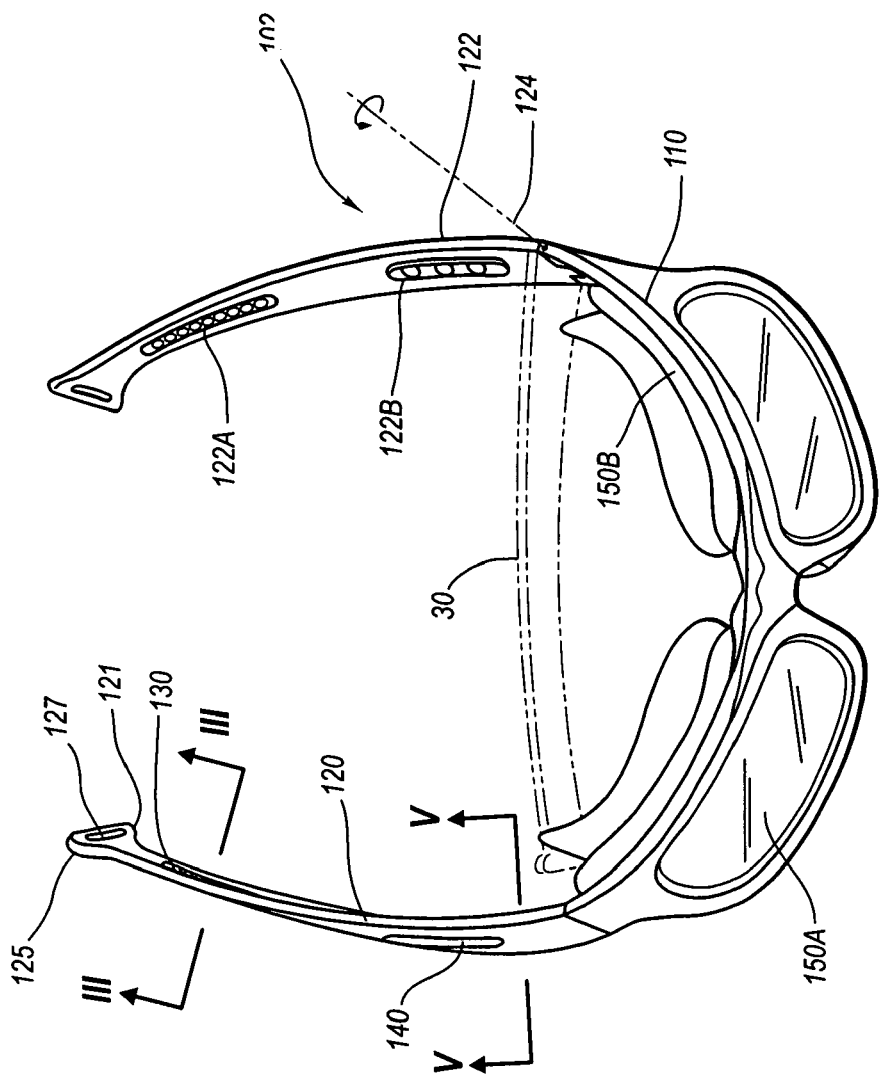
FIG. 2 is a top view of an alternate embodiment or configuration of an eyewear device of the present invention.

In FIG. 2, the eyeglass device 102 is similar to the eyeglass device 100. The eyeglass device 102 includes a frame 110, a first extension 120 and a second extension 122 and a right first lens unit 150A and a left first lens unit 150B. The first extension 120 and the second extension 122 may also be known as temples, ears and stems, and are elongated structural elements that extend from the frame 110 to support and balance the eyeglass device 102. The lens unit 150A and 150 B may be interchanged with other lens units like lens unit 180 shown in FIG. 17. The first extension 120 and the second extension 122 each operate between a deployed position as shown in FIG. 2 and a stored position such as the stored position 122 A shown in phantom. Or course the stored position may be any orientation of the extension such as extension 122 about its axis 124 of rotation from the illustrated deployed position Different lens units provide the eyewear device with multiple eyewear functions. The right first lens unit 150 A and left first lens unit 150 B function like swimming or skiing goggles as more fully discussed hereinafter.

FIG. 3 shows the first (elongated) extension 120 with an interior surface 121 oriented toward the head of the user 20 when the frame 110 is positioned proximate the eyes of the user 20. The first extension 120 has a head grip aperture 124 and a head grip ridge 126. In FIG. 3, the accessory aperture 127 at or proximate the distal end 125 of the first extension 120 can also be seen. A head grip 130 with a head grip channel 131 is shown in the head grip aperture 124. The head grip ridge 126 is shown in the head grip channel 131 to retain the head grip 130 in the head grip aperture 124

The accessory aperture 127 is provided at the distal end 125of the first extension 120. The temple member 120 is manufactured from a suitable plastic or a nylon-based material, such as GRYLAMID nylon so that it is rigid but yet can bend elastically some without inducing any damage. The temple member 120 may also be made from other polymeric material, graphite compositions or metals. The retaining strap 200 can be attached to the eyeglass device 102 at the accessory aperture 127 as discussed hereinafter.

In FIG. 4, the head grip channel 131 of the head grip 130 is shown between the first side 132 having a surface 132A and second side 132 having a second surface 133A. The head grip channel 131 is sized to cooperatively receive the head grip ridge 126 to hold the head grip 130 snuggly but removably in place. That is, the head grip 130 is made from any suitable nylon, latex or rubber-like material that is elastically deformable so that it may be placed in and removed from the head grip aperture 124. At the same time the exterior surfaces 132A and 133A have a higher coefficient of friction than rigid or polished plastics and in turn allow for enhanced gripping. Other polymeric materials may also be used so long as they are essentially elastically deformable and present a surface that has a suitable coefficient of friction to assist in retaining the first extension 120 and in turn the frame 110 in place about the head of the user.

The first side 132 of the head grip 130 has a thickness $t_1$ that is smaller than the thickness $t_2$ of the rear grommet second side 133. The head grip 130 may be installed or placed in the head grip aperture 124 in a first position in which the first surface 132A is a first distance 132B from the interior surface 121. In the second position, the second surface 133A is a second distance 133B from the interior surface 121 with the second distance 133B being greater than the first distance 133A. In the illustrated embodiment of FIG. 4, the first distance 133A and the second distance 133B are illustrated with the interior surface 121 shown twice only to facilitate illustration of the first distance 132B and the second distance 133B. The head grip 130 may assembled in either the first position or the second position so the user can adjust the gripping force applied to the head of the user with the eyewear device 102 installed about the head of the user. That is, with the head grip 130 is assembled so that the first side 132 is oriented toward the interior surface 121, the head grip 130 allows for a looser grip or fit about the wearer's head. If the head grip 130 is removed and installed in the second position so that the second side 133 is oriented toward the interior surface 121, the head grip 130 allows for a tighter grip or fit about the user's head. The head grip 130 has a length 130A selected to provide for enhanced gripping of the user's head (e.g., from about 1 inch to about 2 inches and preferably about 1.5 inches) and is curved along with the first extension to accommodate for the curvature of the user's head.

The head grip 130 may be attached to the first extension 120 by any suitable means to allow for removal and reorientation between the first position and the second position and relatively secure placement when installed. The preferred method is to allow for a mechanical connection by elastic deformation. The first side 132 or the second side 133 is pressed and deformed to pass into and through the head grip aperture 124 and in turn to align and register the channel 131 with the head grip ridge 126. The channel 131 has a gap thickness $t_g$ that substantially matches or is slightly larger than the head grip ridge 126 to provide for a snug and removable fit in the first extension 120.

In FIG. 5, the first extension 120 is shown having multiple head grip apertures and here has another or second grip aperture 138, another head ridge 123 and a head grip 140. In FIG. 6, the second head grip 140 includes a second head grip channel 141, a second head grip second side 142 and a second head grip first side 143. In this and other embodiments, the second head grip 140 is made from the same material as the head grip 130. The second head grip first side 143 has a width $w_2$ that is smaller than the width $w_1$ of the second head grip second side 142. Just like the head grip 130, the second head grip 140 may be reversed between a first position and a second position to provide for a tighter or looser fit for the wearer's head. When the second head grip 140 is assembled into the second head grip aperture 138 in the first position so that the second head grip first side surface 143A is facing inward from said inside surface 121 and spaced therefrom a first distance 143B, then the head grip 140 provides for a looser grip on the wearer's head. If the second head grip 140 is reversed into the second position so that the head grip second side 143 is facing inward and away from the inside surface 121 a second distance 142B which is bigger than the first distance 143B, then the second head grip 140 provides for a tighter grip about the head of the user.

The second head member 140 may be attached to the first extension 120 in a manner similar or the same as that for head member 130. FIG. 7 illustrates a goggle lens group 150 taken from the eyeglass system 100 of FIG. 2. The goggle lens group 150 includes a rim assembly 160 and a sealing member 170. The sealing member 170 provides a seal between a wearer's face and the eyeglass system 100. The seal prevents wind, spray, debris, liquid and other foreign material from entering the eyeglass system 100 and potentially the wearer's eyes.

The second extension 122 shown in FIG. 2 also has a first head grip 122A and a second head grip 122B both of which are comparable respectively to head grip 130 and head grip 140.

Turning now to FIGS. 7–14, a lens unit 160 has a casing 162 into which an eyeglass lens 161 is positioned. Typically, a groove or channel 167 (FIG. 12) is provided to snuggly and fixedly receive a selected eyeglass lens. The eyeglass lens 161 may be any desired eyeglass lens including a polarized filter lens, a sun glass lens, a corrective lens or prescription lens, a tinted lens, a safety glass lens or any other desired lens. The lens 161 has a perimeter 161B and the casing 162 extends totally or completely about the perimeter 161B to define a lens area 161C. In some applications, the casing 162 may not surround the lens perimiter 161B completely but rather may be secured in segments, arcs suitable to retain the lens is securely. The lens 161 may be made from a polycarbonate shatterproof material or any other material found suitable for use as an eyeglass lens so long as it is substantially rigid.

FIG. 9 shows the lens unit 160 including the lens 161, the casing 162, a sealing ridge 163, a groove or channel 164, an outer rim portion 165 and an inner rim portion or lip 166 because it extends away from the frame of the eyeglass device. In various exemplary embodiments, the groove 164 interacts with a corresponding ridge formed in a lens receiving portion of the frame like frame 110 of the eyewear device, which is further discussed later with respect to FIGS. 17 and 18.

In various exemplary embodiments of the invention, the sealing ridge 163 is a raised portion extending in essence radially or outwardly. The sealing member 170 shown only in part in FIG. 9 has a channel 170A sized to snuggly register with the sealing ridge 163 to effect a seal which may be liquid resistant between the casing 162 and the seal member 170. While the use the sealing ridge 163 and channel 170A are preferred to effect a sealing relationship between the casing 162 and the seal member 170, other methods of attachment may be used to attach the sealing member 170 to the lens unit 160 including for example, an adhesive, clamping rings, or fasteners.

The sealing member 170 is shown to be generally tubular in shape and formed to effect a first seal against the eye socket area 24 of the user. That is, the seal member has a flaring rear edge 170 B that is shaped to essentially conform to the shape of the face in the eye socket area 24. The flaring rear edge 170B is thin and easily elastically deformable to conform to any irregularities in the eye socket area. If the eyewear device with the seal member 170 is used under water, the water will present a pressure or force against the exterior of the seal member 170 urging the flaring rear edge 172 tighter against the skin in the eye socket area to effect a water resistant seal or first seal. The water pressure will also urge the seal member 170 and the channel 170A onto the seal ridge 163 to effect a tighter seal and act as a second seal. The eyewear device as so configured may then function as swim goggles. Similarly the mechanical sealing forces of the first seal and the second seal allow the eyewear device as so configured to function as ski goggles, as safety glasses, as glasses to shield the eyes from bright light and as glasses suitable or useful to protect the eyes from blowing material like dust, sand, snow, ice crystals, and dirt.

In various exemplary embodiments, the casing 162 is made from any suitable substantially rigid plastic or plastic-like material including preferably a nylon-based material, such as GRYLAMID nylon. The casing 162 may also be made from other polymeric material, graphite compositions or metals. In FIG. 12, the cross-section illustrates a lens channel 167. The lens 161 is preferably press fin into the lens channel 167 to effect a secure attachment of the lens to the casing 162. In various exemplary embodiments of the invention, the lens 161 snaps into the rim 162 so that at least portions of the edges of the lens 161 fit into the lens channel 167.

FIG. 13 is a cross-section of the lens unit 150 attached to the front frame 110. In various exemplary embodiments, the channel 164 in the casing 152 fits with or mates with a rim ridge 112 extending from frame 110 or rim member as further illustrated in FIGS. 17 and 18. The channel 164 and rim ridge 112 provide a snap-fit or pressure fit which can be effected by pressing on the casing (with one's fingers) from the inner or rear side (toward the eye socket area) toward the frame or rim member 110 as shown by arrow A. The rim ridge 112 and channel can be separated by pressing or urging the casing 162 toward the rear side as shown by arrow B. Notably, the lens unit 150 can be assembled only from the rear side, That is the lens unit 150 can only be urged into assembly from the rear side. The snap-fit allows a user to switch out different types of lens assemblies without using tools.

The sealing member 170 is better shown in FIGS. 14–16. The sealing member 170 includes an inner sealing end 171, an outer sealing end or flaring rear edge 172, a sealing lip attachment 173 and a sealing attachment groove 174. The sealing member 170 is made from neoprene, latex, rubber or another similar flexible and elastically deformable material. In some applications the sealing member 170 may be made of leather or cloth.

The inner sealing end 171 is a flanged portion and is sized to create a seal between the wearer's face and the eyeglass system 100 between the wearer's eye and nose. The outer sealing end 172 is a flanged portion and larger in size than the inner sealing end 171. The outer sealing end 172 flaring rear edge is sized to create a seal against the eye socket area. The outer sealing end 172 creates a continuous seal around the eye socket area and in turn around the user's eye.

The sealing lip attachment 173 includes a sealing attachment groove 174. The sealing attachment groove 174 allows the sealing lip attachment 173 to fit over the sealing ridge 163 as discussed above.

Figure 17:
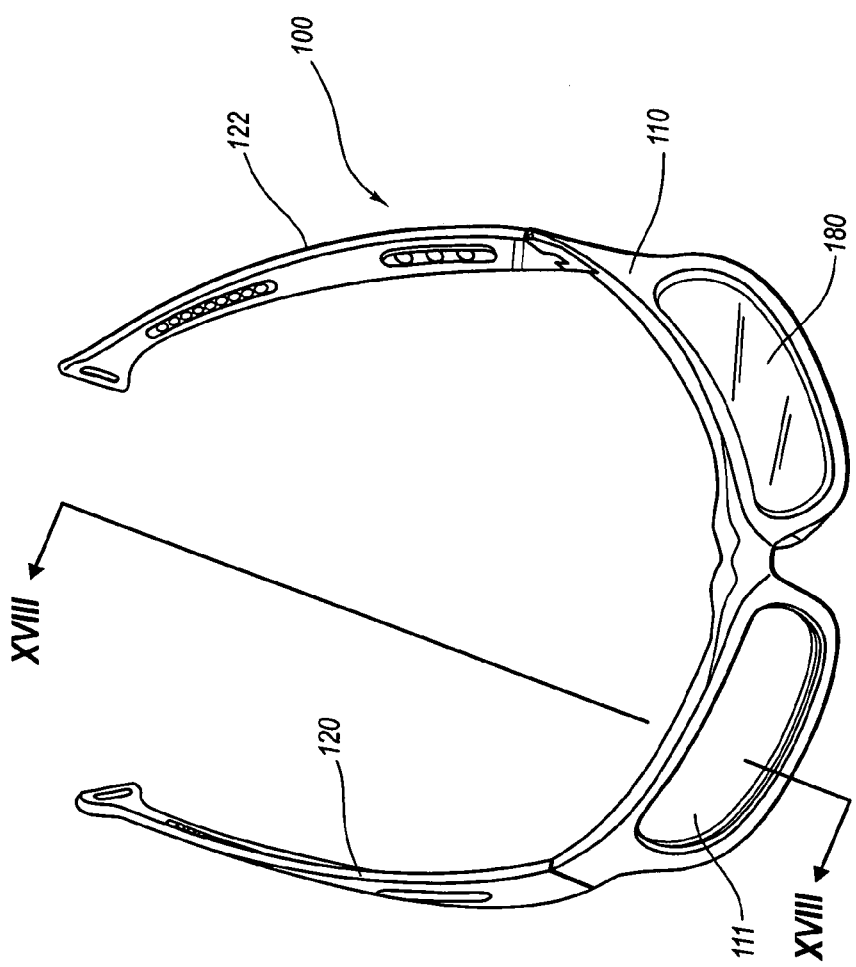
FIG. 17 is a perspective depiction of a third embodiment or configuration of an eyewear device of the present invention.

FIG. 17 illustrates the eyeglass device 100 including the front frame 110, a lens aperture 111, the first extension 120 and the second extension 122 and a lens unit 180. The lens unit 180 is an alternate for lens unit 150 of FIG. 2. FIG. 17 shows the eyeglass system 100 with only one of the lens groups 150 to illustrate the lens aperture 111. Typically, the lens unit 180 on one side is mirrored on the other side.

In FIG. 18, a side view of the first extension 120 is shown including the second head grip aperture 138, the first head grip aperture 124 and the accessory aperture 127. The first head grip 130 and the second head grip 140 are shown exploded away from their respective apertures, 124 and 138.

The front frame 110 or rim of FIG. 18 includes a rim ridge 112 and a hinge 113. The hinge 113 affixes the temple member 120 to the front frame 110 so that the temple member 120 can rotate about the front frame 110 along a plane between a stored position and a deployed position. The rim ridge 112 allows the lens unit 150 or the lens unit 180 to be snapped into the lens aperture 111 of the front frame 110. Although the present invention illustrates the lens unit 150 and the lens unit 180, other various sizes, shapes and styles may be used in accordance with the teachings of the present invention.

Figure 19:
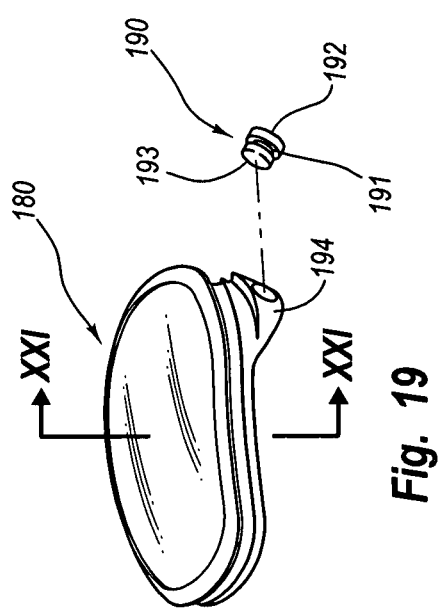
FIG. 19 is a side perspective view with a nose pad exploded away of a lens unit for use in the embodiment of FIG. 17.
Figure 20:
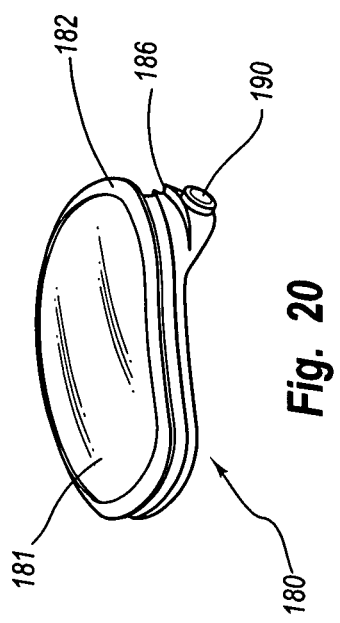
FIG. 20 is a schematic view of a lens unit with the nose pad of FIG. 19 assembled.

FIGS. 19 and 20 illustrate the lens unit 180 taken from the eyewear device 100 of FIG. 17. The lens unit 180 includes a lens 181, a casing 182, a nose piece 186 and a nose pad or grip 190. The lens 181 is made from a polycarbonate shatterproof material. Other polymeric or glass materials may be used to make the lens 181. The lens 181 may be polarized, tinted, corrective, bifocal, clear or other type, including any combination thereof.

The nose pad or grip 190 is shown or exploded or removed from the lens unit 180 in FIG. 19. The nose pad or grip 190 is made from a hypoallergenic rubber. Other polymeric materials may also be used. The nose grip 190 includes a nose grip groove, a nose grip thick portion 192 and a nose grip thin portion 193. The nose grip thick portion 192 is thicker than the nose grip thin portion 193. The nose grip 190 may be changed between a first position and a second position to provide narrower or wider bridge support for the wearer's nose. If the nose grip 190 is assembled so that the nose grip thin portion 193 is facing outward, then the nose grip 190 provides a wider bridge support. If the nose pad or grip 190 is reversed so that the nose grip thick portion 192 is facing outward, then the nose grip 190 provides a narrower bridge support. In effect, in the first position, the thinner portion 193 extends from the nose support surface 194 a first distance, In the second position, the thicker portion 192 extends away from the nose support surface 194 a second distance which is greater than the first distance.

Figure 21:
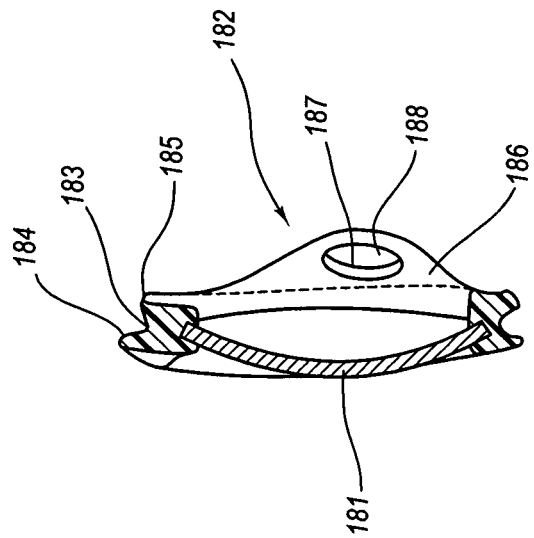
FIG. 21 is a cross-sectional view of the lens unit of FIG. 19 taken at section lines XXI—XXI.

The nose pad or grip 190 may be attached to the nose piece 186 by any suitable means including glues and other mechanical means. Preferably a pressure or snap fit is effected. The nose grip groove 191 and a nose piece ridge 187, as shown in FIG. 21, cooperate to provide the desired snap fit. The nose pad or grip 190 fits into a nose piece aperture 188 of the nose piece 186 formed through the nose support surface 194. The nose piece ridge 187 is arranged around the inside surface of the nose piece aperture 188. The nose grip groove 191 has a gap thickness that substantially matches the nose piece ridge 187 to provide a tight fit in the nose piece 186.

FIG. 21 illustrates the casing 187 including a channel 183, an outer casing portion 184, and inner casing portion 185, the nose piece 186, the nose piece ridge 187 and the nose piece aperture 188. The rim channel 183 is positioned between the outer and inner rim portions 184, 185.

FIGS. 22–26 further illustrate the casing 182 in more detail. The casing 182 is manufactured from a nylon-based material, such as GRYLAMID nylon. The casing 182 may also be made from other polymeric material, graphite compositions or metals. In FIGS. 24–26, the cross-sections illustrate a lens channel 189. The lens 181 snaps into the lens channel 189 of the casing 182 to effect a tight or snug mechanical connection.

FIG. 25 illustrates the cross-section of the lens unit 180 attached to the front frame 110. Notably there is a lip 195 attached to the casing 182 which inhibits the movement of the casing 182 into and through the frame 110 to the interior of the frame 110.

In FIGS. 27 and 28, the a retainer or retaining strap 200 includes a pad 201, a strip 202, a first and second frame attachment mechanisms 203, 204, an attachment band 205 and a ring 206. The pad 201 is made from a foam or foam like material including closed cell neoprene. The pad 201 gives the retaining strap 200 buoyancy so that the eyewear device does not quickly sink if dropped into water and if of sufficient size or dimension can float in water and keep the eyewear device from sinking. The foam may also act as a liquid absorbent to provide the user with suitable absorptive material to control perspiration. The pad 201 may also be made out of various polymeric, leather, nylon duck material, cloth or similar material.

In various exemplary embodiments, the strip 202 substantially covers the pad 201 and is made from a cloth material. The strip 202 may be made from a leather or polymeric material. The pad 201 and/or the strip 201 also may be made from an elastic material. The strip 201 is sized to span between the first extension 120 and the second extension member 122 behind the wearer's head.

The retaining strap 200 can optionally be connected to the eyeglass device such as the devices 100 and 102 by attaching the frame attachment means 203, 204 to the temple members 120 by threading them through the accessory aperture 127. The frame attachment mechanisms 203, 204 here illustrated are made from hook and loop fasteners, such as VELCRO®. That is a hook or pile strap 203A is threaded through the aperture 127 and connected to a coacting hook or pile strip 203B. By use of the hook and pile strap 203B interacting with the strip 203B, the user may adjust the width of the retainer 200 to be loose or tight as desired. The frame attachment mechanisms 203, 204 may also include hooks, rings, buckles, latches, and other attachment mechanisms.

The retainer 200 is desirably attachable to the user to prevent loss of the eyewear device in the event it becomes dislodged in use. Attachment can be effected by a cloth strip with any suitable form of attachment to the retainer 200. That is, hook and pile connectors, snaps, buckles and the like may be used. In the illustrated embodiment of FIGS. 27 and 28, the ring 206 is attached to the retainer 200 and in particular to the strip 202 by any suitable means to effect a mechanical connection including thread, adhesive, rivet(s), bolt(s), clamp(s) or the like. The ring 206 is an optional connector to which a tether or leash 300 can be attached by a snap hook or the like. That is, attachment 205 may extend a selected distance and have a hook or other fastener for attachment to the user or the user's clothing. A short attachment 205 with the ring 206 is preferred because the safety leash or tether may then be removed from the retainer 200 particularly if the user is working in or about moving equipment.

Figure 29:
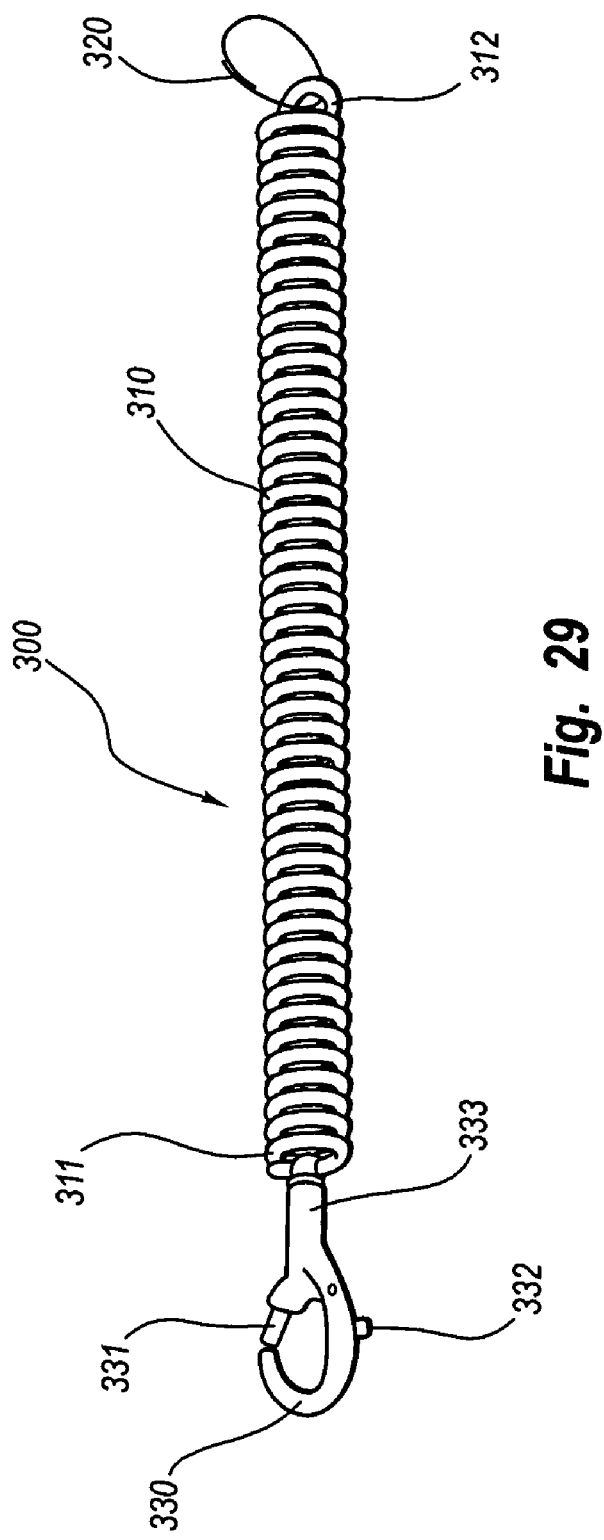
FIG. 29 is a depiction of a safety leash of the present invention.

In FIG. 29, the tether or safety leash 300 includes a coiled 310 stretch which has spring like qualities so that after extension, it recoils to the configuration illustrated. A ring 320 and a latch 330 are provided for attachment to either the retainer 200 or to the user and more particularly to the user's clothing. The ring 320 has overlapping ends to allow the ring 320 to attach to the ring 206 on the retaining strip 200 or the accessory aperture 127. The ring 320 is made from a polymeric or metallic material. Other connection mechanisms can also be used, such as a hook, a latch, a loop or a similar mechanism.

The latch 330 includes a latch mechanism such as snap lock 331. It has a lever 332 and a latch swivel ring 333. When the lever 332 is actuated, the latch mechanism 331 rotates about a pivot to open and close the latch 330. The latch 330 includes a latch swivel ring 333 at the distal end of the latch 330. The coil 310 includes first and second coil ends 311, 312. The coil 310 is made from a polymeric, cloth or metallic material. The coil 310 may be wound in a spring-like manner. Alternatively, a flexible strip of cloth or polymeric material may be used. The latch swivel ring 333 is affixed to the first coil end 311 and the ring 320 is connected to the second coil end 312. The latch 330 can be attached to the wearer's apparel, such as a collar. The safety leash 300 provides an additional method for keeping the eyewear assembly attached to the wearer.

Turning now to FIG. 30, an alternate retainer 350 is shown made from a nylon duck material with piping 352 stitched or otherwise fastened about the perimeter 354. The retainer 350 is securable to the distal end or rear of the temples 356 and 358 of eyeglasses by a cloth ribbon 360 which is threaded through the apertures 362 and 364 of the temples 356 and 358. The cloth ribbon 360 has a first section 366 and a second section 368 each secured to the retainer 350 by any suitable means including glue, staples. As here shown, stitching is preferred. A first loop 370 is an extension of the first section 366 and is sized to extend away from the retainer 350 and through the aperture 362 and back through a ring 372 to a lock 374. The first loop 370 extends through the lock which is operable between a locked or closed position and an open position in which the cloth ribbon may be threaded through an aperture as discussed hereinafter.

A second loop 376 extends from the second section 368 and is sized like the first loop 370 so that it may be threaded through the aperture 364 of the temple 358 and back through the ring 378 to and through the lock 374. The cloth ribbon 360 used to form the loops 370 and 376 is any suitable cloth that is very thin with a height 380 sufficient to provide the cloth ribbon with structural strength. While any desired material may be used, it is preferred that the ribbon 360 be made of a thin (about ⅟64ths of an inch thick or less) nylon material with a height from about ¼ inch to about ½ inch and preferably about ⅜ths of an inch.

The ends 382 and 384 of the loops 370 and 376 are threaded through the lock 374. As seen in FIG. 31, the lock is a spring loaded by spring 390 urging a inner section 386 outward 388 thereby misaligning the aperture 392 formed in the body 393 with the aperture 394 in the inner section to thereby frictionally hold anything threaded through the apertures 392 and 394 when placed in alignment by pressing on the top 396 of the inner section 386 and urging it tinward 398 and in turn compressing the spring 390 to a compressed position 390A. With the apertures 392 and 329 aligned, the ends 382 and 384 may be and here are threaded therethrough. Upon release of the pressure on the top 396, the inner section 386 is urged outward to expanded position 390B to in turn misalign the apertures 392 and 394 and in turn clamping or locking the ends 382 and 384.

To use the retainer 350 of FIG. 30, the first loop 370 and the second loop 376 are threaded through the apertures 362 and 364 in the ends of the temples 356 and 358 and back through the rings 372 and 378. The ends are threaded through the lock 374 as shown. The user then places the eyeglasses having the temples 356 and 358 on his or her head and then tightens the retainer 350 by pulling on the lock 374 and in turn the loops 370 and 375 to a desired tightness. The user then holds the ends 382 and 384 in one hand and operates the lock 374 toward the inward direction 398 and then slides the lock 374 toward the retainer 350. When the retainer 350 is deemed to be at the desired tightness, the lock 374 is released and in turn the loops 370 and 376 are then locked to retain the related eyeglasses securely about the head of the user.

In FIG. 32, an additional or alternate lens unit 402 is shown positioned in the frame 110 with a ridge groove 404 snapped into position with the ridge 164 in alignment therewith to effect a secure but removable connection.

Affixed to the rear or inner surface 406 of the lens unit 402 by any suitable means such as, but not limited to, glue is a sponge like seal 408. That is, the seal 408 is formed of any suitable open cell material that is elastically deformable. The seal 408 has a depth 410 selected to be slightly more than the distance from the surface 406 to the face of the user. With the frame 110 mounted on the nose with the lens unit proximate the eyes, the seal 408 extends to and is a little compressed. The seal 408 thus deforms over any surface irregularities on the user's face. The seal 408 also has a thickness 410 selected to preclude wind, dust and dirt from easily passing there through or there past. The thickness 410 may be from 1/8 to 1/4 inch but is preferably about 3/8ths of an inch.

The seal 408 is formed of the open cell material so that it can breathe. That is, the user may sweat when wearing the glasses during exercise. To allow the moisture trapped within the seal 408, a plurality of vent slots 412, 414 and 416 are formed along the upper region 417 of the seal 408 to allow air to circulate in and out and thus reduce the moisture within the cavity 419 defined by the seal 408. Vents 418, 420 and 422 are formed along the lower region 424 of the seal 408 to facilitate the flow of air into and out of the cavity 419. Thus glasses or frame 110 with a lens units 402 installed for each eye are suitable for use when hiking, jogging, skiing, or performing any other exercise because fogging is minimized by the venting. Beyond that, when the user stops limiting the ability to ventilate the cavity 419, the user may simply urge the frame 110 down along the bridge of the user's nose to space the frames away from the user's face and allow air to freely pass in and out of the cavity 419 while allowing moisture trapped in the seal to evaporate.

In use, it can be seen that an eyewear device 100 or 102 may be provided with an inventory of lens units like lens units 180, 150 and 402. A lens unit would be provide for both the right and left eyes and in effect be a pair. One pair of lens units in the form of lens unit 180 may be provided with a clear lens. Another pair of lens units in the form of lens unit 180 may be provided with a yellow tinted lens. Yet another pair may be provided with a polarized lens and yet another with a desired sunglass lens or multiple pair with different sunglass lenses (e.g., green, rose and grey). Other pairs of lens units in the form of lens unit 150 may also be provided each with different lenses for different conditions. All lenses may be made to effect desired corrections. That is corrective lenses may be used as desired or appropriate. With each lens unit having a casing, it can be seen that the lens units are less prone to be lost and less prone to suffer damage to the edges or perimeter. Changing the from one pair of lens units to another is easily effected using finger pressure to snap out the existing lens units and replace them with new lens units. As a result, the user is able to modify the eyewear device into a wide range of useful eyewear including swim goggles, ski goggles, motor cycle goggles, bicycle goggles, bright light goggles, sunglasses, low light glasses, and general purpose glasses. Lens units in the form of lens unit 150 are m assembled from the inside of the frame 110 while the lens units in the form of lens unit 180 are assembled from the front. With continued use, the user will be able to quickly recognize the different configurations of the lens units so that the correct pair can be selected from a collection or inventory and easily and quickly installed or exchanged. In practice, the user may have a soft cloth bag or sack to retain lens units that are not in use for easy storage in a back pack, pocket, or fanny pack or for attachment to a belt or other loop or ring associated with the user's clothing.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. An eyewear device, comprising:
   a frame for positioning proximate the eyes of a user, said frame including a lens-receiving portion having a first rim defining a first lens area and a second rim defining a second lens area, said first rim having a first rim ridge extending toward said first lens area and a second rim ridge extending toward said second lens area;
   means for retaining said frame proximate the eyes of a user; and
   a first lens and a second lens each sized and shaped for positioning in front of an eye of a user, and
      a first lens frame removably positionable in said first lens area only in a first direction from said eye of a user towards said first lens area, said first lens frame having an interior configured to receive and retain said first lens and an exterior with a first groove formed thereon sized to effect a snap fit with said first rim ridge upon positioning of said first lens frame in said first lens area, said lens frame having a first lip configured to inhibit the movement of said first lens frame in said first direction past said first lens area, and
      a second lens frame removably positionable in said second lens area only in a second direction from said eye of a user towards said second lens area, said second lens frame having an interior configured to receive and retain said second lens and an exterior with a second groove sized to effect a snap fit with said second rim ridge upon positioning of said second lens frame in said second lens area, said lens frame having a second lip configured to inhibit the movement of said first lens frame in said second direction past said first lens area.

2. The eyewear device of claim 1, wherein said frame is spaced from the outer surface of the eye socket of the user a seal distance when said frame is positioned proximate the eyes of a user, wherein said eyewear device further includes a seal member attached to said casing, said seal member being sized and shaped to extend from said casing toward said eye socket of a user.

3. The eyewear device of claim 2 wherein said casing includes a lip extending outward from said casing toward the eye socket of a user when said eyewear device is positioned proximate the eyes of a user, and wherein said seal member is attached to said lip.

4. The eyewear device of claim 3 wherein said seal member is formed of a wind resistant material.

5. The eye wear device of claim 3 wherein said seal member is formed of an elastically deformable and water resistant material and is generally tubular in shape with an interior and an exterior.

6. The eyewear device of claim 5 wherein said seal member includes a first seal for effecting a seal against the eye socket area to inhibit fluid flow from exterior said seal member into the interior of said seal member, wherein said seal member includes a second seal for attaching said seal member to said casing and to inhibit fluid flow from exterior said seal member to the interior of said seal member.

7. The eyewear device of claim 6 wherein said eyeglass lens has a perimeter, wherein said casing is formed to extend about the entire perimeter of said eyeglass lens, wherein said lip extends from said casing about the entire perimeter of said eyeglass lens, and wherein said lip has a seal ridge extending outwardly therefrom, and wherein said second seal of said seal member includes a channel to snuggly receive said seal ridge.

8. The eyewear device of claim 7 wherein said seal member is made from a rubber like material.

9. The eyewear device of claim 1, wherein said means for positioning said frame proximate the eyes of a user includes a first elongate extension and a second elongate extension each connected to said frame to extend toward the user's ears with said frame positioned proximate the eyes of a user; said first and said second elongate extensions each having an interior surface oriented toward the head of the user when said frame is positioned proximate the eyes of the user.

10. The eyewear device of claim 9 wherein said first and said second elongate extensions each have at least one head grip aperture formed therein sized to receive a head grip and wherein said eyewear device further includes at least one head grip positioned in at least one of said head grip apertures, said head grip being sized and shaped to extend away from said interior surface of said elongate extension to frictionally contact the head of a user when said eyewear device is positioned on the head of a user, said head grip comprising a first surface and a second surface for frictionally contacting the head of a user, said second surface and said first surface being in general alignment and spaced from each other, said head grip being formed to be removably positionable in said head grip aperture in a first position and in a second position, said head grip in said first position having said first surface oriented toward the head of the user and spaced away from said interior surface of said elongate extension a first distance and said head grip in said second position having said second surface oriented toward the head of the user and spaced away from said interior surface a second distance, said second distance being greater than said first distance.

11. The eyewear device of claim 10 wherein said second distance is about twice said first distance.

12. The eyewear device of claim 10 wherein said first extension and said second extension each have a plurality of head grip apertures formed therein with a head grip removably positioned in each of said head grip apertures.

13. The eyewear device of claim 10, wherein each of said head grip apertures includes a ridge and wherein each of said head grips is formed to include a channel formed to receive said ridge therein in said first position and in said second position.

14. The eyewear device of claim 10 wherein said head grip is formed from an elastically deformable material.

15. The eyewear device of claim 9, wherein each of said first elongate extension and said second elongate extension has a proximal end secured to said frame and a distal end opposite said proximal end, wherein said eyewear device further includes a retainer having a first end and second end and a stretch extending between said first end and said second end, said first end and said second end each being attachable to a said distal end of said first extension and said distal end of said second extension to extend about the rear of the head with said frame positioned proximate the eyes of a user.

16. The eyewear device of claim 15 wherein a first retaining aperture is formed in said first elongate extension proximate the distal end thereof and a second retaining aperture is formed in said second elongate extension proximate said distal end thereof, and wherein said first end of said retainer is configure to attach to said first retaining aperture and said second end of said retainer is configured to attach to said second retaining aperture.

17. The eyewear device of claim 16, wherein said stretch of said retainer has a length and wherein said retainer includes at least one means for adjusting the length of said stretch.

18. The eyewear device of claim 17, further including a leash for securing the eyewear device to the clothes of a user, said leash having means for attaching to said retainer and means for attaching to the user's clothing.

19. The eyewear device of claim 1, wherein said casing has a nose piece oriented toward the nose or a user with said lens unit positioned in said lens receiving portion and said frame positioned proximate the eyes of a user.

20. The eyewear device of claim 19, wherein said nose piece has a support surface oriented toward said user's nose, said support surface having a nose pad aperture formed therein, and wherein said nose piece includes a nose pad removably positioned in said nose pad aperture, said nose pad having a first nose surface for contact with the user's nose.

21. The eyewear device of claim 20, wherein the nose pad includes a second nose surface for contact with the user's nose said second nose surface and said first nose surface being spaced from each other and in general alignment, said nose pad being formed to be removably positionable in said nose pad aperture in a first position and in a second position, said nose pad in said first position having said first nose surface oriented toward the nose of the user and spaced away from said support surface of said nose piece a first distance and said nose pad in said second position having said second nose surface oriented toward the nose of the user and spaced away from said support surface of said nose piece a second distance, said second distance being greater than said first distance.

22. The eyewear device of claim 21 wherein said second distance is about twice said first distance.

23. The eyewear device of claim 22 wherein said nose pad is made of an elastically deformable material.

24. The eyewear device of claim 23 wherein said nose piece aperture has a nose piece ridge formed therein and wherein said nose pad has a channel sized to receive said nose piece ridge.

25. An eyewear device, comprising:
a frame for positioning proximate the eyes of a user, said frame having
a lens receiving portion and said frame having an inner surface oriented toward the eyes of a user and an outer surface spaced from said inner surface and oriented outwardly and away from said frame and the eyes of said user;
a first casing configured to receive and retain a first eyeglass lens, said first casing being configured for removable attachment and positioning in said lens receiving portion only in a direction from said inner surface toward said outer surface, said first casing having a first raised lip portion projecting outward therefrom and sized to inhibit the movement of said first casing through said lens receiving portion;
a second casing configured to receive and retain a second eyeglass lens, said second casing being configured for removable attachment and positioning in said lens receiving portion only in a direction from said inner surface toward said outer surface, said second casing having a second raised lip portion projecting outward therefrom to inhibit the movement of said second casing through said lens receiving portion; and means for retaining said frame proximate the eyes of a user.

26. The eyewear device of claim 25 wherein said lens receiving portion includes a first rim defining a first lens area and a second rim defining a second lens area, and wherein said first rim has a first rim ridge extending toward said first lens area and a second rim ridge extending toward said second lens area, wherein said first lens unit includes a first lens, wherein said second lens unit includes a second lens, wherein said first casing has a first lens frame configured to receive and retain said first lens and a first groove sized to effect a snap fit with said first rim ridge upon positioning of said first lens frame in said first lens area and wherein said second casing has a second lens frame configured to receive and retain said second lens and a second groove sized to effect a snap fit with said second rim ridge upon positioning of said second lens frame in said second lens area.

27. The eyewear device of claim 26, wherein said first casing includes a first lip extending outward from said first casing toward the eye socket of a user when said eyewear device is positioned proximate the eyes of a user, wherein said first eyeglass lens has a first perimeter, wherein said first casing is formed to extend about the entire first perimeter of said first eyeglass lens, wherein said first lip which extends around said casing about the entire first perimeter of said first eyeglass lens, and wherein said first lip has a first seal ridge extending outwardly from said first casing to inhibit movement of said first casing out through said first lens receiving portion.

28. The eyewear device of claim 27 wherein said second casing includes a second lip extending outward from said frame and away from the eye socket area of a user to inhibit movement of said second casing from outward of said frame through said first lens receiving portion toward the eye socket of the user.

29. The eyewear device of claim 28 wherein said frame is spaced from the outer surface of the eye socket of the user a seal distance when said frame is positioned proximate the eyes of a user; wherein said eyewear device further includes a seal member attached to said first lip of said first casing, said seal member being sized and shaped to extend from said first casing to said eye socket of the user.

30. An eyewear device, comprising:
a frame;
a lens for positioning proximate the eyes of a user, said lens being attached to said frame;
first and second elongate extensions rotatably attached to said frame to be movable from a deployed position to a stored position, said first elongate extension including a first aperture and said second elongate extension including a second aperture;
a buoyant retaining strap configured to float on top of water, said buoyant retaining strap having a first strap end and second strap end with a stretch there between, said buoyant retaining strap having a first ribbon retaining means attached to said first end and a second ribbon retaining means attached to said second end, said buoyant retaining strap configured to contact and be snug fit to the back of a user's head;
a ribbon configured to connect said first and second elongate extensions to said buoyant retaining strap, said ribbon having a first ribbon end and a second ribbon end, a length there between and a tension, said first ribbon end looped through said first aperture and said first ribbon retaining means and said second ribbon end looped through said second aperture and said second ribbon retaining means; and
a locking means for receiving said first and second ribbon ends, said locking means configured to increase said tension on said ribbon causing said buoyant retaining strap to contact said back of a user's head.

31. The eyewear device of claim 30, further including a safety leash, the safety leash being attachable to the retaining strap and a person's clothing.

32. An eyewear device, comprising:
a frame for positioning proximate the eyes of a user, said frame including a lens-receiving portion;
eyeglass lens means for positioning in front of an eye of a user, said eyeglass lens being connected to said frame to be in said lens receiving portion;
a first elongate extension and a second elongate extension each connected to said frame to extend toward the user's ears with said frame positioned proximate the eyes of a user, said first and said second elongate extensions each having an extension interior surface oriented toward the head of the user when said frame is positioned proximate the eyes of the user;
at least one head grip aperture formed in said first and said second elongate extensions each head grip aperture being sized to receive a head grip; and
at least one head grip positioned in one of said head grip apertures, said head grip being sized and shaped to extend away from said interior surface of said first and said second elongate extension to frictionally contact the head of a user when said eyewear device is positioned on the head of a user, said at least one head grip having a first surface and a second surface on said head grip for frictionally contacting the head of a user, said first surface and said second surface being in general alignment and spaced from each other, said at least one head grip being formed to be removably positionable in said at least one head grip aperture in a first position and in a second position, said head grip in said first position having said first surface oriented toward the head of the user and spaced away from said extension interior surface of said elongate extension a first distance and said head grip in said second position having said second surface oriented toward the head of the user and spaced away from said extension interior surface a second distance, said second distance being greater than said first distance.

33. The eyewear device of claim 32 wherein said second distance is about twice said first distance.

34. The eyewear device of claim 33 wherein said first extension and said second extension each have a plurality of head grip apertures formed therein with a head grip removably positioned in each of said head grip apertures.

35. The eyewear device of claim 34, wherein each of said head grip apertures includes a ridge and wherein each of said head grips is formed to include a channel formed to receive said ridge therein in said first position and in said second position.

36. The eyewear device of claim 35 wherein said head grip is formed from an elastically deformable material.

37. An eyewear device, comprising:
a frame for positioning proximate the eyes of a user, said frame including a lens-receiving portion;
means for retaining said frame proximate the eyes of a user; and
a lens unit configured to be removably positionable in said lens receiving portion, said lens unit including, eyeglass lens means for positioning in front of an eye of a user, and
a casing configured to receive and retain said eyeglass lens means, said casing including a nose piece oriented toward the nose of a user with said lens unit positioned in said lens receiving portion and said frame positioned proximate the eyes of a user, said nose piece having,
a support surface oriented toward said user's nose,
a nose pad aperture formed in said support surface, and
a nose pad removably positioned in said nose pad aperture, said nose pad having a first nose surface for contact with the user's nose and a second nose surface for contact with the user's nose, said second nose surface and said first nose surface being spaced from each other and in general alignment, said nose pad being formed to be removably positionable in said nose pad aperture in a first position and in a second position, said nose pad in said first position having said first nose surface oriented toward the nose of the user and spaced away from said support surface of said nose piece a first distance and said nose pad in said second position having said second nose surface oriented toward the nose of the user and spaced away from said support surface of said nose piece a second distance, said second distance being greater than said first distance.

38. The eyewear device of claim 37 wherein said second distance is about twice said first distance.

39. The eyewear device of claim 38 wherein said nose pad is made of an elastically deformable material.

40. The eyewear device of claim 39 wherein said nose piece aperture has a nose piece ridge formed therein and wherein said nose pad has a channel sized to receive said nose piece ridge.

41. An eyewear device, comprising:
a frame for positioning proximate the eyes of a user, said frame having an inner surface oriented toward the eyes of a user and an outer surface spaced from said inner surface and oriented outwardly and away from said frame and the eyes of said user, said frame having a first rim defining a first lens area and a second rim defining a second lens area, said first rim having a first rim ridge extending toward said first lens area and a second rim having a second rim ridge extending toward said second lens area;
a first lens unit having a first casing having a first lens frame configured to receive and retain a first eyeglass lens and a first groove sized to effect a snap fit with said first rim ridge upon positioning of said first lens frame in said first lens area, said first lens unit being configured for removable attachment and positioning in one of said lens receiving portions only through said inner surface, said first lens unit having a first raised lip portion projecting outward from said first lens unit at a distance greater than said first groove, said first raised lip portion configured to inhibit the movement of said first lens unit from said inner surface and through said first lens area;
a second lens unit having a second casing having a second lens frame configured to receive and retain a second eyeglass lens and a second groove sized to snuggly and slideably receive said second rim ridge upon positioning of said second lens frame in said second lens area, said first lens unit being configured for removable attachment and positioning in one of said lens receiving portions only through said inner surface, said second casing having a second raised lip portion projecting outward from said second casing at a distance greater than said second groove, said second raised lip portion configured to inhibit the movement of said second lens unit from said inner surface and through said second lens area; and
a first elongate extension and a second elongate extension each rotatably connected to said frame to extend toward the user's ears with said frame positioned proximate the eyes of a user; said first and said second elongate extensions each being movable from a deployed position extending toward the ears of the user and a stored position displaced from said deployed position, said first and second extensions each having an interior surface oriented toward the head of the user when said frame is positioned proximate the eyes of the user.

42. The eyewear device of claim 41 wherein said first and said second elongate extensions each have at least one head grip aperture formed therein sized to receive a head grip and wherein said eyewear device further includes at least one head grip positioned in at least one of said head grip apertures, said head grip being sized and shaped to extend away from said interior surface of said elongate extension to frictionally contact the head of a user when said eyewear device is positioned on the head of a user, said head grip having,
a first exterior surface for frictionally contacting the head of a user, and
a second exterior surface for frictionally contacting the head of a user, said second exterior surface and said first exterior surface being in general alignment and spaced from each other, said head grip being formed to be removably positionable in said head grip aperture in a first position and in a second position, said head grip in said first position having said first exterior surface oriented toward the head of the user and spaced away from said interior surface of said elongate extension a first distance and said head grip in said second position having said second exterior surface oriented toward the head of the user and spaced away from said interior surface a second distance, said second distance being greater than said first distance.

43. The eyewear device of claim 42, wherein said frame is spaced from the eye socket of a user a seal distance when said frame is positioned proximate the eyes of a user, wherein said eyewear device further includes a seal member attached to said first casing, said seal member being sized and shaped to extend from said casing toward said eye socket of a user.

44. The eyewear device of claim 43 wherein a first retaining aperture is formed in said first elongate extension proximate the distal end thereof and a second retaining aperture is formed in said second elongate extension proximate said distal end thereof, and wherein said first end of said retainer is configured to attach to said first retaining aperture and said second end of said retainer is configured to attach to said second retaining aperture.

* * * * *